United States Patent
Vermeersch

(10) Patent No.: US 8,677,851 B2
(45) Date of Patent: Mar. 25, 2014

(54) ENERGY ABSORBING SHIFT LEVER ASSEMBLY WITH REUSABLE LATCHING MECHANISM

(75) Inventor: Michael C. Vermeersch, Saginaw, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 1468 days.

(21) Appl. No.: 11/978,826

(22) Filed: Oct. 30, 2007

(65) Prior Publication Data

US 2009/0107278 A1    Apr. 30, 2009

(51) Int. Cl.
*B60K 20/06*    (2006.01)

(52) U.S. Cl.
USPC ..................................... 74/473.31

(58) Field of Classification Search
USPC .................. 74/473.24, 473.25, 473.3, 473.31
See application file for complete search history.

(56) References Cited

U.S. PATENT DOCUMENTS

| | | | |
|---|---|---|---|
| 752,738 A | 2/1904 | Wheeler | |
| 2,317,672 A | 4/1943 | Cooley | |
| 2,849,892 A | 9/1958 | Du Shane | |
| 3,464,288 A | 9/1969 | Sheridan | |
| 3,513,720 A | 5/1970 | Allport | |
| 3,561,281 A * | 2/1971 | Wilfert | 74/473.3 |
| 3,602,065 A | 8/1971 | Ratcliff | |
| 3,750,492 A * | 8/1973 | Holmes, Jr. | 74/523 |
| 3,977,692 A | 8/1976 | Findley et al. | |
| 4,075,903 A | 2/1978 | Cornell | |
| 4,244,237 A | 1/1981 | Sprunger | |
| 5,050,442 A | 9/1991 | Reed | |
| 5,992,261 A | 11/1999 | Iwata et al. | |
| 6,029,535 A * | 2/2000 | Kenny et al. | 74/473.3 |
| 6,029,536 A | 2/2000 | Sugiyama | |
| 6,047,611 A | 4/2000 | Warren et al. | |
| 6,082,216 A | 7/2000 | Watanabe et al. | |
| 6,120,412 A * | 9/2000 | Fujinuma | 477/99 |
| 6,205,882 B1 | 3/2001 | Jolley | |
| 6,272,945 B1 | 8/2001 | Jolley | |
| 6,286,385 B1 | 9/2001 | Nishimura et al. | |
| 6,439,074 B1 * | 8/2002 | Stencel | 74/473.31 |
| 6,460,426 B1 | 10/2002 | Kataumi et al. | |
| 6,460,427 B1 | 10/2002 | Hedderly | |
| 6,526,842 B1 | 3/2003 | Tanaka et al. | |
| 6,584,870 B2 | 7/2003 | Nishimura et al. | |
| 6,637,285 B2 | 10/2003 | Jolley | |
| 6,776,066 B2 | 8/2004 | Braun et al. | |
| 7,201,080 B1 | 4/2007 | Canonico | |
| 2009/0205460 A1 | 8/2009 | Cymbal et al. | |

* cited by examiner

Primary Examiner — Vicky Johnson
(74) Attorney, Agent, or Firm — Cantor Colburn LLP

(57) ABSTRACT

A shift lever assembly for operating a transmission of a vehicle includes a mounting shaft an extension shaft coupled thereto. The extension shaft is pivotable between an operating position and a collapse position relative to the mounting shaft. A latching mechanism is disposed within a bore defined by one of the mounting shaft and the extenstion shaft. The latching mechanism includes a compression spring biasing against a plunger. One of the mounting shaft and the extension shaft defines a seat. The plunger engages the seat in the interlocking engagement when the extension shaft is in the operating position. The plunger holds the extension shaft in the operating position until a force greater than a pre-determined value is applied to the extension shaft to compress the plunger and permit the extension shaft to pivot into the collapse position. The extension shaft is repeatably moveable between the operating position and the collapse position.

20 Claims, 5 Drawing Sheets

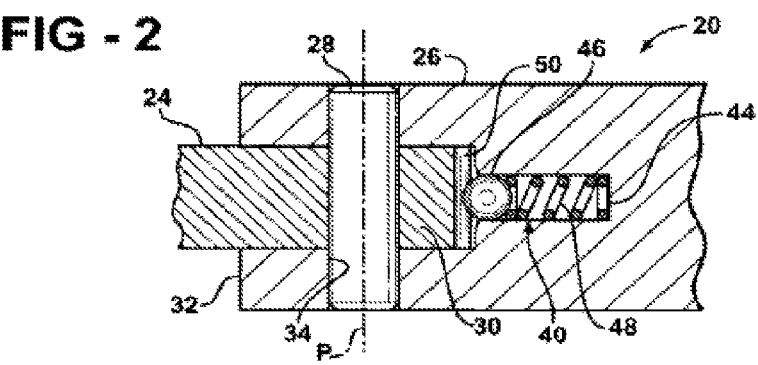
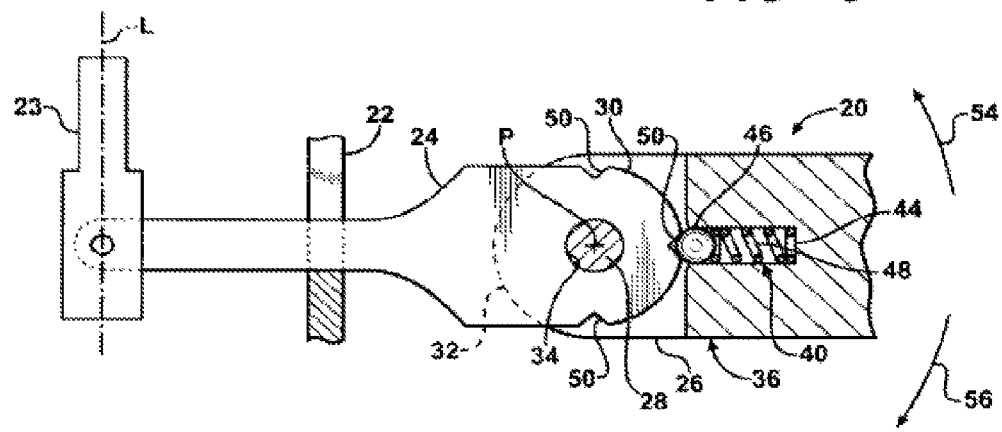
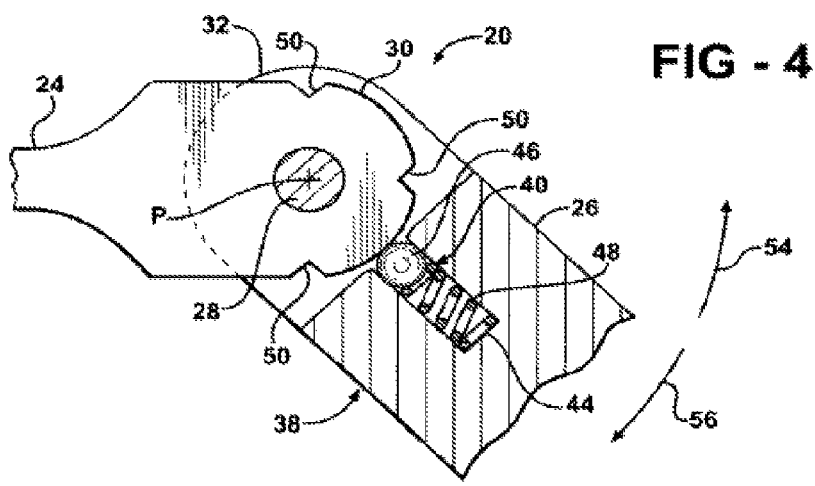

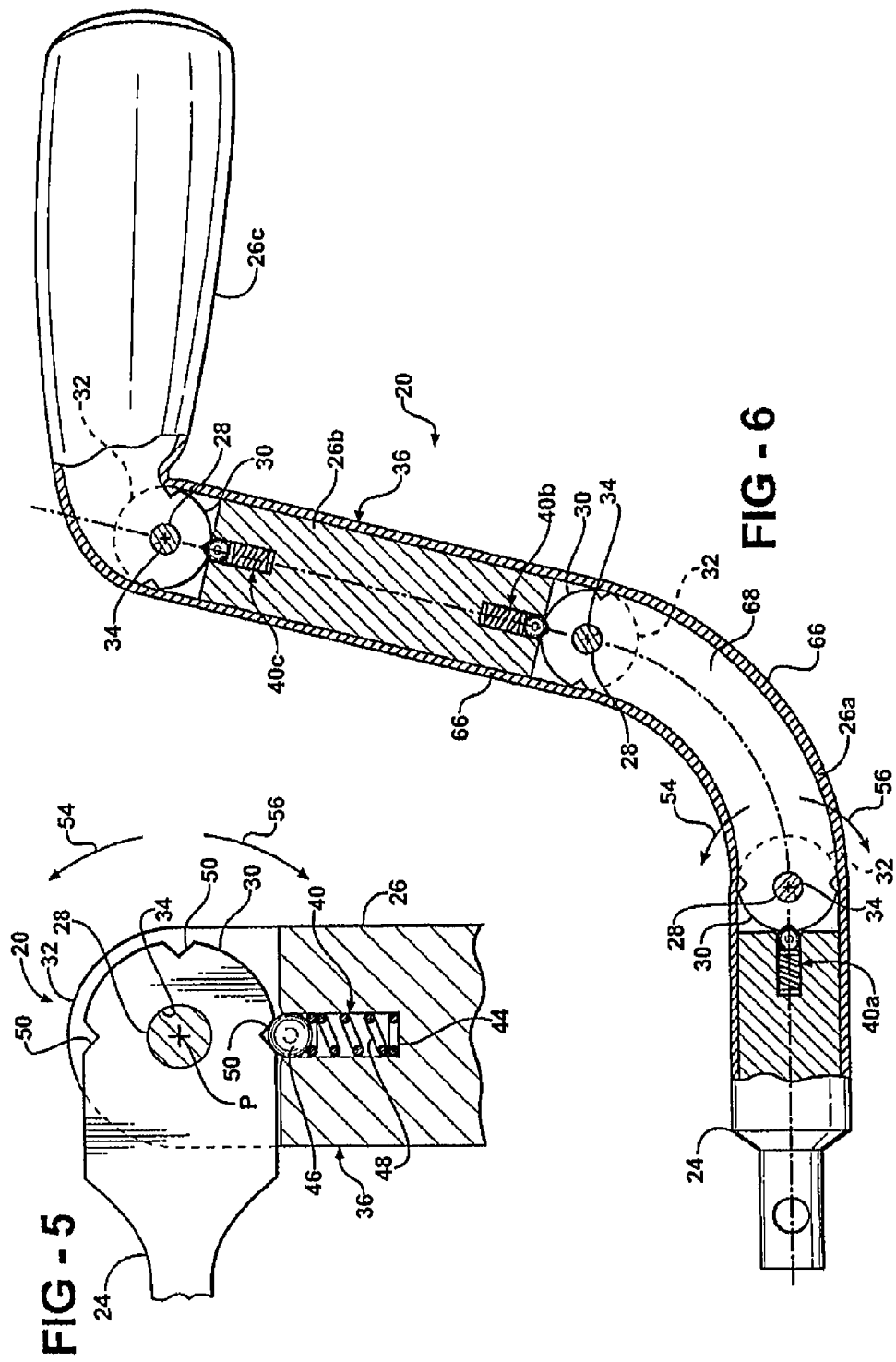

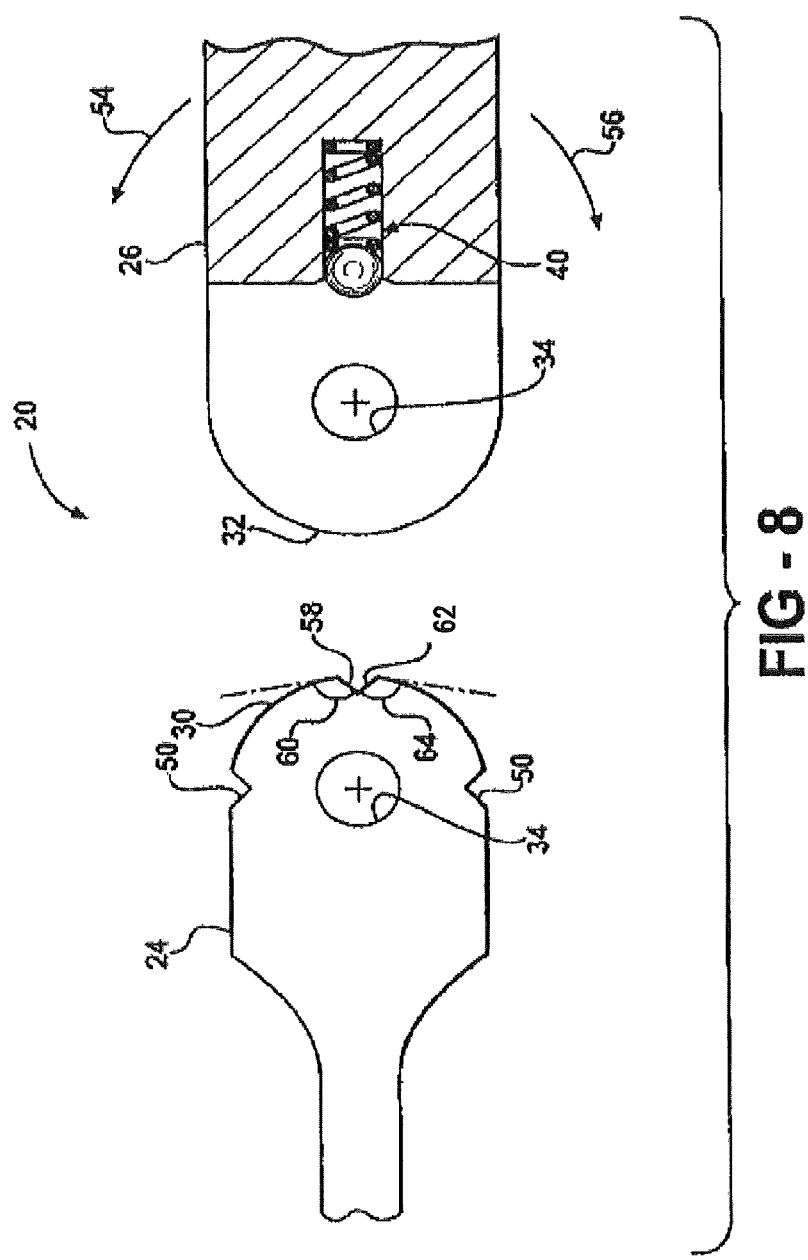

ENERGY ABSORBING SHIFT LEVER ASSEMBLY WITH REUSABLE LATCHING MECHANISM

BACKGROUND OF THE INVENTION

1. Field of the Invention

The subject invention generally relates to a shift lever assembly for operating a transmission of a vehicle.

2. Description of the Prior Art

Current safety guidelines require that a transmission shift lever of a vehicle be collapsible to alleviate the possibility of injury during an accident, i.e., the safety guidelines require that the transmission shift lever collapse (break-away, disconnect, etc.) upon application of a force greater than a pre-determined value.

Accordingly, several different transmission shift lever connections have been developed to meet these safety guidelines. Typically, these connections include a frangible pin interconnecting the transmission shift lever with a support structure of the vehicle. The frangible pin fractures upon application of a force to the transmission shift lever greater than the pre-determined value, thereby at least partially disconnecting the transmission shift lever from the support structure. While these types of connections satisfy the safety guidelines, the transmission shift lever is left inoperable until the fractured parts are replaced and the transmission shift lever is re-connected to the support structure.

SUMMARY OF THE INVENTION AND ADVANTAGES

The subject invention discloses a shift lever assembly for a vehicle having a transmission. The assembly comprises a mounting shaft coupled to the vehicle for operating the transmission. An extension shaft is coupled to the mounting shaft. The extension shaft is moveable relative to the mounting shaft between an operating position and a collapse position. A latching mechanism is coupled to one of the mounting shaft and the extension shaft, and abuts one of the mounting shaft and the extension shaft in frictional engagement. The latching mechanism is moveable between a lock position restraining the pivotable movement of the extension shaft and a release position permitting the pivotable movement of the extension shaft in response to application of a force to the extension shaft greater than a pre-determined value.

Accordingly, the transmission shift lever of the subject invention collapses in response to a force greater than the pre-determined value as required by the relevant safety standards, without breaking any components or disconnecting from any support structure of the vehicle. Because no components are broken and the shift lever assembly is not disconnected during collapse, the shift lever assembly of the subject invention is easily and repeatably moveable back into the original operating position.

BRIEF DESCRIPTION OF THE DRAWINGS

Other advantages of the present invention will be readily appreciated, as the same becomes better understood by reference to the following detailed description when considered in connection with the accompanying drawings wherein:

FIG. 2 is a fragmentary cross-sectional view of a side of the transmission shift lever assembly;

FIG. 3 is a fragmentary cross sectional view of a top of the transmission shift lever assembly in an operating position;

FIG. 4 is a fragmentary cross sectional view of the top of the transmission shift lever assembly in a collapse position;

FIG. 5 is a fragmentary cross sectional view of the top of the transmission shift lever assembly in a second operating position;

FIG. 6 is a cross sectional view of a first embodiment of the transmission shift lever assembly;

FIG. 8 is an enlarged exploded fragmentary view of the shift lever assembly.

DETAILED DESCRIPTION OF THE INVENTION

Figure 1:
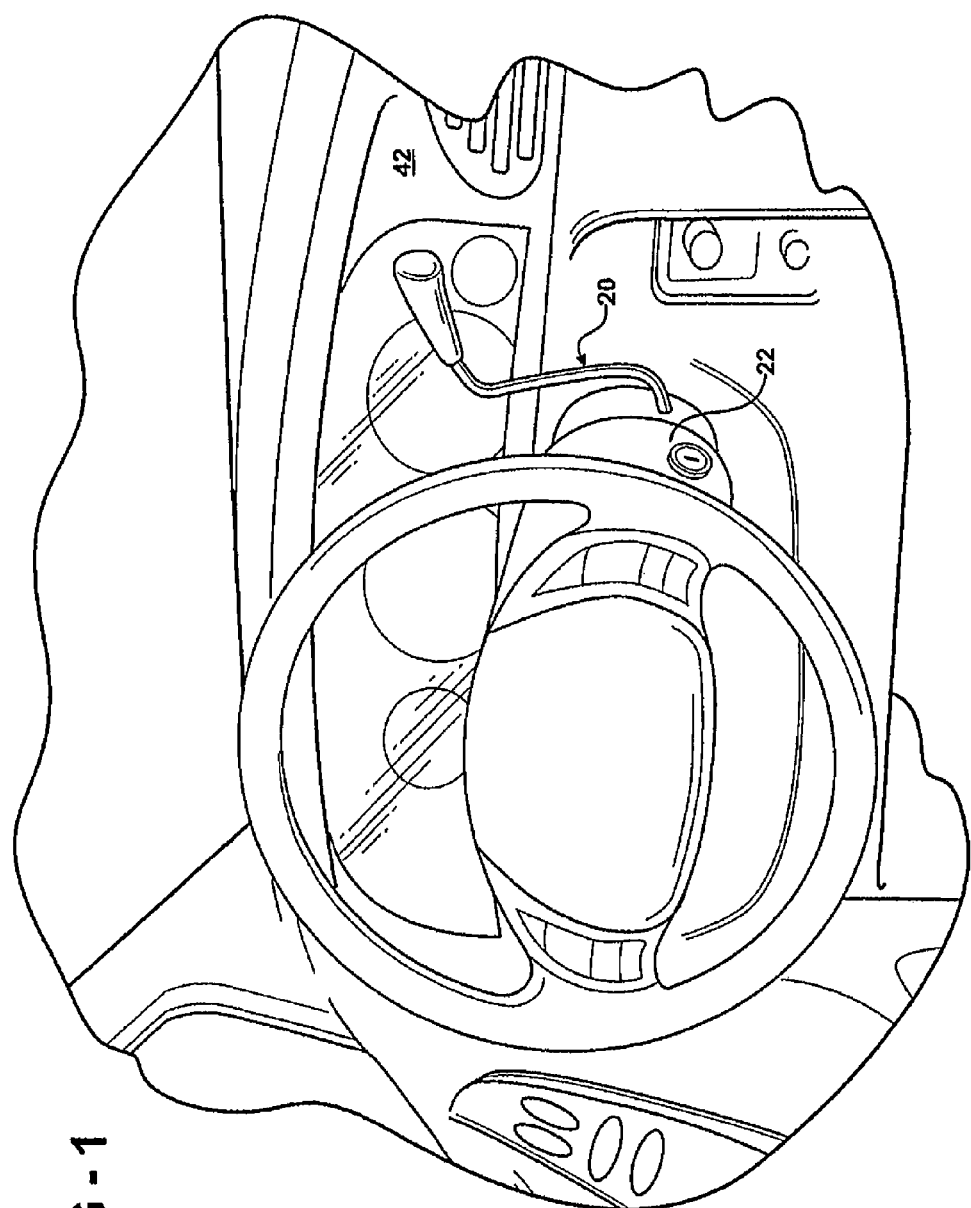
FIG. 1 is a fragmentary perspective view of an interior of a vehicle showing a transmission shift lever assembly relative to an instrument panel and a steering wheel.

Referring to the Figures, wherein like numerals indicate corresponding parts throughout the several views, a shift lever assembly is generally shown at 20. The shift lever assembly 20 is for a vehicle having a transmission. As shown in FIG. 1, the shift lever assembly 20 is preferably mounted to the vehicle at a steering column 22 and is connected to the transmission as is well known in the art. However, it should be appreciated that the shift lever assembly 20 of the subject invention may also be mounted to the vehicle at a center console as is also well known in the art. The shift lever assembly 20 operates the transmission by changing drive gears of the transmission. Referring to FIG. 3, when mounted to the vehicle at the steering column 22, the shift lever assembly 20 is typically connected to a shifter bracket 23. The shifter bracket 23 is coupled to the transmission through a series of rods and cables. In use, an operator rotates the shift lever assembly 20 back along a longitudinal axis L of the steering column 22 in order to rotate both the shifter bracket 23 and the shift lever assembly 20 about the longitudinal axis L.

Referring to FIGS. 2 through 5, the shift lever assembly 20 comprises a mounting shaft 24, which is coupled to the vehicle for operating the transmission. Typically, when mounted at the steering column 22, the mounting shaft 24 is attached to the shifter bracket 23, shown schematically in FIG. 3. The mounting shaft 24 may be directly attached to the shifter bracket 23, or an intermediate coupling may interconnect the mounting shaft 24 and the shifter bracket 23.

An extension shaft 26 is coupled to the mounting shaft 24. An annular pin 28 interconnects the mounting shaft 24 and the extension shaft 26. One of the mounting shaft 24 and the extension shaft 26 defines a planar male end portion 30 and the other of the mounting shaft 24 and the extension shaft 26 defines a channel like female end portion 32, with the planar male end portion 30 disposed within the channel like female end portion 32, i.e., the channel like female end portion 32 sandwiches the planar male end portion 30 therebetween. It should be appreciated that the male end 30 and the female end 32 may be defined by either the mounting shaft 24 or the extension shaft 26. The male end 30 and the female end 32 define a concentric bore 34 extending through the male end 30 and the female end 32. The annular pin 28 is disposed within and extends through the bore 34. The annular pin 28 defines a pivot axis P, best shown in FIG. 2. The extension shaft 26 is moveable relative to the mounting shaft 24 between an operating position 36, best shown in FIGS. 3 and 5; and a collapse position 38, best shown in FIG. 4. Preferably, the extension shaft 26 is pivotable between the operating position 36 and the collapse position 38 relative to the mounting shaft 24 about the pivot axis P.

A latching mechanism 40 is coupled to one of the mounting shaft 24 and the extension shaft 26, and abuts the other one of the mounting shaft 24 and the extension shaft 26 in frictional engagement. Preferably, the latching mechanism 40 is coupled to the channel like female end 32, as defined by one of the mounting shaft 24 and the extension shaft 26, within the channel of the female end 32. However, it should be appreciated that the latching mechanism 40 may also be coupled to the planar male end 30, as defined by the other one of the mounting shaft 24 and the extension shaft 26. The latching mechanism 40 is moveable between a lock position restraining the pivotable movement of the extension shaft 26, best shown in FIGS. 3 and 5; and a release position permitting the pivotable movement of the extension shaft 26, best shown in FIG. 4.

Figure 7:
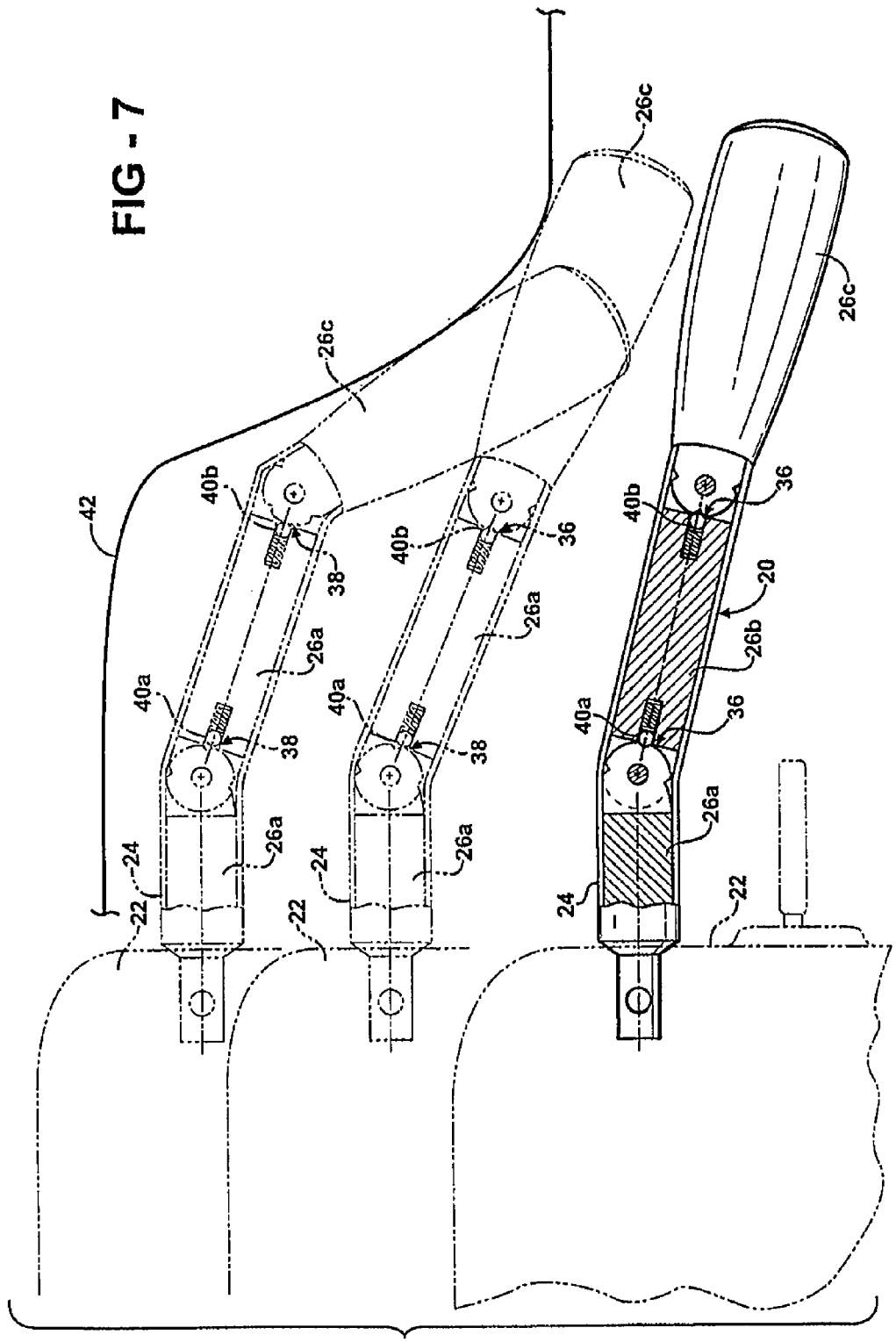
FIG. 7 is a cross sectional view of a second embodiment of the transmission shift lever assembly.

The latching mechanism 40 is moveable in response to application of a force to the extension shaft 26 greater than a pre-determined value. The pre-determined value is determined by design and safety criteria. The pre-determined value is greater than the normal operating force applied to the shift lever assembly 20 to operate the transmission, but is less than a collision force applied during a vehicular collision when the shift lever assembly 20 is struck. Referring to FIG. 7, the shift lever assembly 20 may be struck as a result of a vehicular collision, for example, when the steering column 22 collapses into an instrument panel 42 of the vehicle to reduce the likelihood of injury to the operator. As the steering column 22 collapses, the shift lever assembly 20 is drawn into and struck by the instrument panel 42. Accordingly, the pre-determined value is set at a level high enough to allow normal operation of the shift lever assembly 20, yet low enough so as not to interfere with collapse of the steering column 22 during a vehicular collision, or low enough so as not injure the operator when struck by the operator directly.

One of the mounting shaft 24 and the extension shaft 26 defines a recess 44. The latching mechanism 40 is partially disposed within the recess 44. Preferably, the one of the mounting shaft 24 and the extension shaft 26 defining the channel like female end 32 also defines the recess 44, with the recess 44 disposed at the bottom of the channel. The latching mechanism 40 includes a plunger 46. The plunger 46 is partially disposed within the recess 44. A compression spring 48 is disposed within the recess 44, below the plunger 46, to bias the plunger 46 against one of the mounting shaft 24 and the extension shaft 26.

The compression spring 48 includes a spring constant, with the pre-determined value being dependent upon the spring constant. The spring constant is related to the force a spring will provide against compression. Accordingly, increasing the spring constant relates to an increase in the force to compress the spring. Therefore, by increasing the spring constant of the compression spring of the subject invention, the pre-determined value will also increase, as a larger force must be provided to compress the plunger 46 against the compressions spring, thereby permitting rotation of the extension shaft 26 relative to the mounting shaft 24.

The other one of the mounting shaft 24 and the extension shaft 26 (i.e., the one of the mounting shaft 24 and the extension shaft 26 not defining the recess 44) defines a seat 50. As shown in FIGS. 3 and 5, the latching mechanism 40 is in interlocking engagement with the seat 50 when the extension shaft 26 is in the operating position 36. As shown in FIG. 4, the latching mechanism 40 is disengaged from the seat 50 when the extension shaft 26 is in the collapse position 38. Accordingly, one of the mounting shaft 24 and the extension shaft 26 defines the recess 44 with the latching mechanism 40 therein and the other of the mounting shaft 24 and the extension shaft 26 defines the seat 50. The plunger 46 of the latching mechanism 40 engages the seat 50 when the extension shaft 26 is in the operating position 36, and is disengaged from the seat 50 when the extension shaft 26 is in the collapse position 38. By applying a force to the shift lever assembly 20 greater than the pre-determined value to rotate the extension shaft 26 relative to the mounting shaft 24, the extension shaft 26 compresses the plunger 46 into the recess 44 against the compression spring 48. Compressing the plunger 46 into the recess 44 releases the engagement between the seat 50 and the plunger 46.

The one of the mounting shaft 24 and the extension shaft 26 that defines the seat 50 includes an outer periphery, with the seat 50 preferably defining a v-shaped wedge in the outer periphery. The seat 50 may include a plurality of seats 50 thereby defining a plurality of different operating positions 36. It should be appreciated that the number, location, and configuration of the seats 50 may differ from that shown or described herein. Specifically, the seat 50 may define a concave cup instead of the v-shaped wedge, and have any number of seats 50 disposed about the outer periphery defining.

The extension shaft 26 is pivotable in a first direction 54 and a second direction 56 opposite the first direction 54 relative to the mounting shaft 24. In other words, the extension shaft 26 is pivotable both forward and backward relative to the mounting shaft 24 along the longitudinal axis L of the steering column 22. Referring to FIG. 8, if the seat 50 includes the v-shaped wedge, then the v-shaped wedge includes a first wall 58 forming a first angle 60 relative to the outer periphery, and a second wall 62 forming a second angle 64 relative to the outer periphery. The pre-determined value in the first direction 54 of rotation is dependent upon the first angle 60, and the pre-determined value in the second direction 56 of rotation is dependent upon the second angle 64. A steeper angle between the first wall 58 and the second wall 62 of the v-shaped wedge relative to the outer periphery requires the pre-determined value to be higher, thereby increasing the force necessary to move the extension shaft 26 into the collapse position 38. By having the first angle 60 differ from the second angle 64, the pre-determined value for moving the extension shaft 26 over the first wall 58 will differ from the pre-determined value for moving the extension shaft 26 over the second wall 62. Accordingly, the pre-determined value in both the first direction 54 of rotation and the second direction 56 of rotation may be tuned as required for design and safety considerations.

Referring to FIGS. 6 and 7, a first embodiment if the shift lever assembly 20 is shown in FIG. 6, and a second embodiment of the shift lever assembly 20 is shown in FIG. 7. In the first and second embodiments, the extension shaft 26 includes a plurality of extension shafts 26a, 26b, 26c linearly coupled together. The latching mechanism 40 further includes a plurality of latching mechanisms 40a, 40b, 40c disposed between each of the plurality of extension shafts 26. A covering 66 is disposed over the mounting shaft 24 and the plurality of extension shafts 26 to provide an aesthetically pleasing shift lever assembly 20. Preferably, the covering 66 is flexible so that it does not fracture, i.e., the covering 66 stretches to accommodate the relative motion between the mounting shaft 24 and the extension shafts 26, as well as between each of the plurality of extension shafts 26, as the extension shafts 26 move between the operating position 36 and the collapse position 38.

As is shown in FIG. 6, at least one of the plurality of extension shafts 26 may define a curved section 68. It should be appreciated that the shift lever assembly 20 may be configured to fit the specific design and space requirements of different vehicles, and may therefore have any number of straight extension shaft sections 26 and curved extension shaft sections 68.

The invention has been described in an illustrative manner, and it is to be understood that the terminology which has been used is intended to be in the nature of words of description rather than of limitation. As is now apparent to those skilled in the art, many modifications and variations of the present invention are possible in the light of the above teachings. It is, therefore, to be understood that within the scope of the appended claims, wherein reference numerals are merely for convenience and are not to be in any way limiting, the invention may be practiced otherwise than as specifically described.

What is claimed is:

1. A shift lever assembly for a vehicle having a transmission and a steering column, said assembly comprising:
   a mounting shaft coupled to the vehicle for operating the transmission;
   an extension shaft coupled to said mounting shaft and moveable about a pivot axis, relative to said mounting shaft, between an operating position and a collapse position, the pivot axis being oriented so that the extension shaft is pivotable from the operating position, in which the extension shaft extends from a longitudinal axis of the steering column, to the collapse position, in which the extension shaft is disposed substantially along the longitudinal axis; and
   a latching mechanism coupled to one of said mounting shaft and said extension shaft and abutting one of said mounting shaft and said extension shaft in frictional engagement and moveable between a lock position and a release position in response to application of a force to said extension shaft greater than a pre-determined value;
   the lock position of the latching mechanism configured for restraining said pivotable movement of the extension shaft about the pivot axis;
   the release position of the latching mechanism configured for permitting said pivotable movement of said extension shaft from the operating position to the collapse position.

2. An assembly as set forth in claim 1 further comprising an annular pin interconnecting said mounting shaft and said extension shaft and defining the pivot axis wherein said extension shaft is pivotable relative to said mounting shaft about said pivot axis.

3. An assembly as set forth in claim 2 wherein one of said mounting shaft and said extension shaft defines a seat with said latching mechanism in interlocking engagement with said seat when said extension shaft is in said operating position and said latching mechanism disengaged from said seat when said extension shaft is in said collapse position.

4. An assembly as set forth in claim 3 wherein said one of said mounting shaft and said extension shaft defining said seat includes an outer periphery and said seat defines a v-shaped wedge in said outer periphery.

5. An assembly as set forth in claim 4 wherein said extension shaft is pivotable in a first direction and a second direction opposite said first direction and wherein said v-shaped wedge includes a first wall forming a first angle relative to said outer periphery and a second wall forming a second angle relative to said outer periphery wherein said pre-determined value in said first direction of rotation is dependent upon said first angle and said pre-determined value in said second direction of rotation is dependent upon said second angle.

6. An assembly as set forth in claim 4 wherein said seat includes a plurality of seats to define a plurality of operating positions.

7. An assembly as set forth in claim 2 wherein one of said mounting shaft and said extension shaft defines a recess with said latching mechanism partially disposed within said recess.

8. An assembly as set forth in claim 7 wherein said latching mechanism includes a plunger partially disposed within said recess and a compression spring disposed within said recess to bias said plunger against one of said mounting shaft and said extension shaft.

9. An assembly as set forth in claim 8 wherein said compression spring includes a spring constant and said pre-determined value is dependent upon said spring constant.

10. An assembly as set forth in claim 1 wherein said extension shaft includes a plurality of extension shafts linearly coupled together and said latching mechanism further includes a plurality of latching mechanisms disposed between each of said plurality of extension shafts.

11. An assembly as set forth in claim 10 further comprising a covering disposed over said mounting shaft and said plurality of extension shafts.

12. An assembly as set forth in claim 10 wherein at least one of said plurality of extension shafts defines a curved section.

13. An assembly as set forth in claim 1, one of the mounting shaft and the extension shaft defining a planar male end portion, and the other of the mounting shaft and the extension shaft defining a female end portion disposed so as to sandwich the male end portion.

14. An assembly as set forth in claim 13, wherein the male end and the female end define a concentric bore that extends through the male end and the female end, further comprising a pin disposed in the concentric bore, the pin interconnecting said mounting shaft and said extension shaft and defining the pivot axis.

15. An assembly as set forth in claim 13, wherein the planar male end portion defines defines a seat with said latching mechanism in interlocking engagement with said seat when said extension shaft is in said operating position, and with said latching mechanism disengaged from said seat when said extension shaft is in said collapse position.

16. An assembly as set forth in claim 15, the predetermined value being less than a collision force applied when the shift lever assembly is struck as a result of a vehicular collision.

17. An assembly as set forth in claim 15, the predetermined value being set at a level low enough to allow collapse of the steering column during a vehicular collision.

18. An assembly as set forth in claim 1, the predetermined value being less than a collision force applied when the shift lever assembly is struck as a result of a vehicular collision.

19. An assembly as set forth in claim 1, the predetermined value being set at a level low enough to allow collapse of the steering column during a vehicular collision.

20. An assembly as set forth in claim 1, wherein the pivot axis is disposed substantially perpendicular to the longitudinal axis.

* * * * *